Patented Oct. 31, 1950

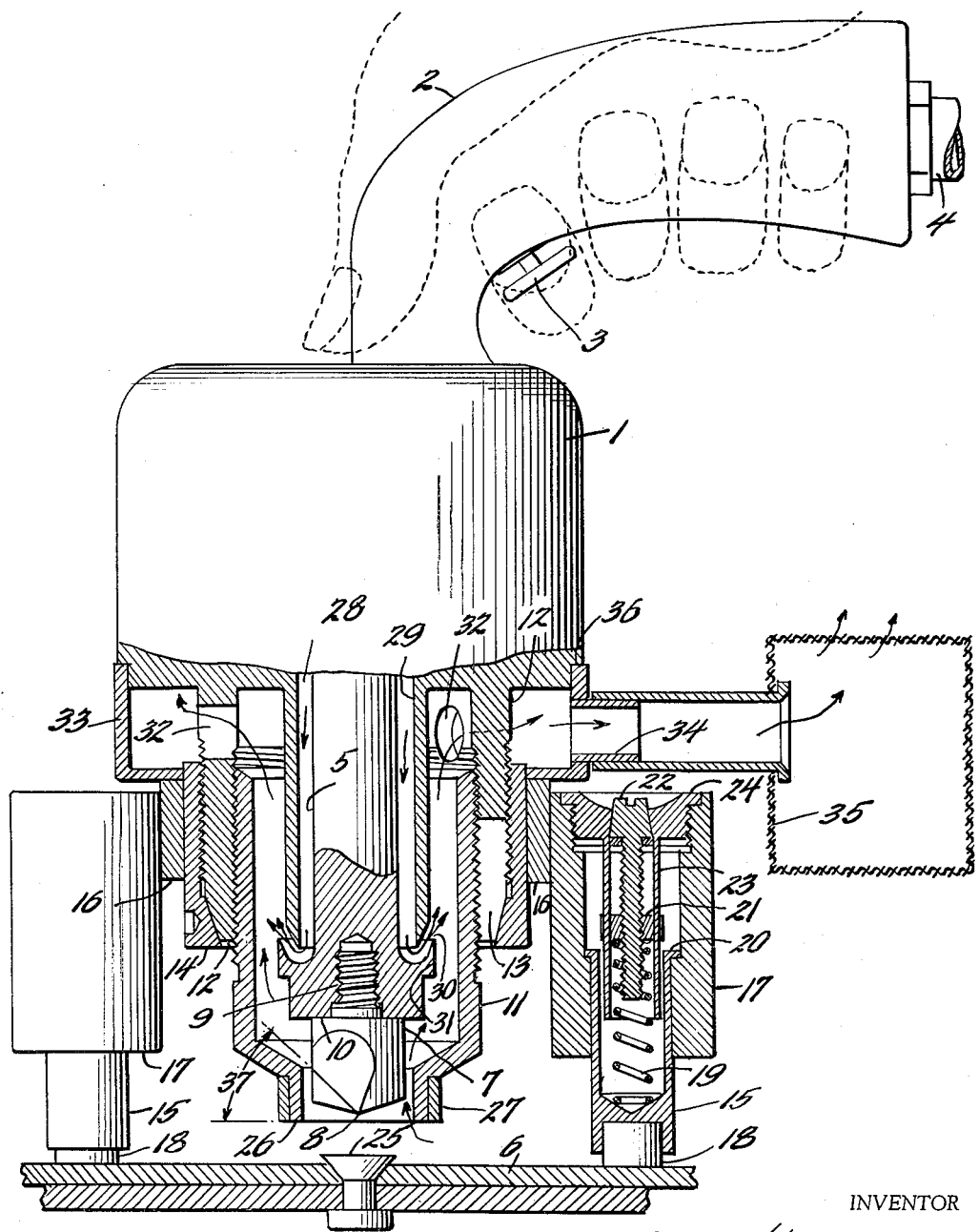

2,527,968

UNITED STATES PATENT OFFICE 2,527,968

MILLING TOOL

Albert Sherman, Forest Hills, and Robert Gottlieb, Arverne, N. Y.; said Sherman assignor to Herbert W. Pfahler, Forest Hills, N. Y.

Application August 15, 1944, Serial No. 549,500

4 Claims. (Cl. 90—12)

Our invention relates to milling machines and particularly to portable, vertical-spindle, power-driven milling machines of light weight and small size which are primarily intended for use as hand tools. The milling tools in our invention are provided with a novel form of end-mill cutter which can perform spot-facing operations wherein small circular areas in aluminum-alloy are machined flat. The object of our invention is to provide a milling tool which, while of wide utility, is particularly suitable for use in the removal of those portions of countersunk rivet heads which might project from the smooth outer surfaces of airplanes.

Such a device, to be effective, must be capable of accurately machining each projecting rivet head to be as smooth and as even with the adjacent surrounding surface as may be desired. The milling tool in our invention, therefore, is provided with an adjustable means for precisely governing the cutting depth or cutting clearance of the end-mill cutter with respect to the said surface. In this connection, it is important that the cutter be so mounted as to eliminate any possibility of axial looseness or end play which would adversely affect the required accuracy of the machining operation. Also in this connection, the milling tool in our invention is provided with an air system for the disposal of the chips produced so as to prevent said chips from interfering with the accuracy of the machining operation.

It will be appreciated by anyone skilled in the art, that when an end-mill cutter, mounted in a hand tool, is made to approach a rivet head in order to cut it even with the surrounding surface, the action of cutting has a tendency to cause the cutter to repeatedly push itself in sidewise directions from the rivet head. Said tendency, if not counteracted, makes it difficult for the operator to quickly, precisely and satisfactorily remove the projecting portions of rivet heads. Our invention, however, provides a stabilizing element which opposes the undesirable effect described and maintains the cutter in position with respect to the rivet head it is cutting.

Our invention, therefore, provides a portable, vertical milling tool of an eminently practical nature for spot-facing operations, it being quite feasible with the aid of this improved milling tool for an operator, who lacks mechanical skill or long training, to successfully accomplish, rapidly, easily and precisely, the required rivet-head trimming operation.

Other objects and novelties of our invention will become apparent from the accompanying figure and description thereof which illustrate a certain embodiment of our invention and hereby become part of this specification. While this embodiment is disclosed by way of illustration, it will be appreciated by those skilled in the art that the component elements of our invention are not limited to the example shown but are susceptible to various skillful modifications or substitutions in accordance with the existing knowledge without departing from the novelty and intent of our invention.

The figure is a partially cutaway side view of a milling tool of our invention powered with a compressed-air motor and shown as it would appear when aligned for operation.

In the drawing 1 is a cylindrical housing enclosing a motor, driven by compressed air, whose details are not shown and which may be of any suitable type. 2 is a handle extending from the housing 1 and shaped for the convenience of the operator. Contained within the handle 2 are air passages and a throttle 3 for governing the flow of compressed air from the air line 4 to the air motor within the housing 1. Although for purposes of illustration we describe our device as being powered by an air motor, we do not so limit our invention but intend it to be adaptable to any suitable driving means.

As shown in the drawing, the drive shaft 5 of the motor is perpendicularly disposed with respect to the riveted surface 6 on which the milling tool is employed. The drive shaft 5 carries mounted coaxially at its lower extremity an end-mill cutter 7 which therefore is subject to being rotated about its longitudinal axis by the motor. The end-mill cutter 7, therefore, can perform spot-facing operations with its endwise cutting edges 8 when the milling tool is properly manipulated, as will be described later.

Although any suitable form of fastening may be employed for demountably attaching the cutter 7 to the shaft 5, a preferred manner of mounting is shown which is common in the art. The upper portion 9 of the cutter 7 is concentrically reduced in diameter and is threadably engaged within the lower extremity of the shaft 5. The upper surface 10 of the cutter 7, surrounding the base of the threaded portion 9, bears against the lower surface of the shaft 5, thus fixedly positioning the cutter with respect to the shaft. The torsional force produced in the cutter 7 by the act of cutting, furthermore, tends to maintain the cutter tight against the shaft. The form of mounting described eliminates the possibility of the cutter 7 accidentally changing its axial position relative to the shaft 5. This feature is important with regard to maintaining a high degree of accuracy and reliability in the adjustment of the cutting depth or cutting clearance of the milling tool. For the same reason, the shaft 5 is so supported in its bearings as to be rstrained from endwise freedom of motion with respect to the housing 1.

The adjustable stop 11 is a tubular body which coaxially encloses the cutter 7, and whose upper portion is threadably engaged within the chuck 12, a cylindrical member that is fixedly mounted at the bottom of the housing 1. The lower portion of the chuck 12 is segmented, being slotted longitudinally in several places 13 around its circumference, and is externally tapered conically downwards. A cylindrical nut 14 threadably engages its own upper portion with the outside surface of the middle portion of the chuck 12. The lower portion of the nut 14 is internally tapered conically downwards to match the lower portion of the chuck 12 which it encircles. When the nut 14 is turned so as to be drawn upwards by its threads with respect to the chuck 12, the segments of the lower portion of the chuck are constricted by the action of the tapered portions so as to press inwardly upon the adjustable stop 11 and thus prevent it from being able to turn in the chuck 12.

The stabilizing element comprises two spring-cushioned telescoping legs 15 and 17 mounted on a ring 16. The ring 16 is deformed so as to be slightly ellipsoidal in shape having its major and minor internal diameters respectively somewhat greater and somewhat less than the outside diameter of the nut 14, so that when the ring 16 is pushed over the nut 14 it can grip the nut with a spring force to maintain itself thereon. The stabilizing element, thereby, can be turned about the axis of the milling tool to suit the convenience of the operator, and is easily demountable. Each telescoping leg comprises a cylindrical strut 15 slidably engaged within, and projecting out the bottom of, a cylinder 17 which is permanently fastened to the ring 16 so as to be substantially parallel to the shaft 5. The lower extremity of each strut 15 is provided with a pad 18 of reasonably soft material preferably possessing a high coefficient of friction, such as rubber for example. Each telescoping leg is extended by an internally disposed coil spring 19, which is in compression. When fully extended, the lower extremity of the strut 15 projects below the cutting edges 8 of the cutter 7. The strut 15 is prevented from falling out of the cylinder 17 by a suitable flange 20 on the upper extremity of the strut and a corresponding shoulder in the cylinder. The initial compression in the spring 19 is controlled by the vertical position of the crosshead member 21 which abuts against the upper end of the spring 19 and is threadedly engaged with the adjusting screw 22. Said crosshead member is restrained from rotating by a suitable fixed guide member 23. The head of the adjusting screw 22 is tapered conically upwards and is seated under pressure of the spring 19 in a corresponding tapered hole in the cylinder head 24. Turning the adjusting screw 22 varies the vertical position of the crosshead 21 which adjusts the initial compression in the coil sping 19.

When a countersunk rivet head 25 that is projecting above the smooth surface 6 of a sheet is to be spot faced even with the adjacent surrounding surface, the milling tool in our invention is held with the pads 18 of the telescoping legs 15 against the surface 6, the said milling tool having been manipulated by the operator so that the cutter 7 is centered about the rivet head 25 as shown in the figure. The cutter 7, which is being rotated at high speed by the air motor, is then fed into the rivet head 25 by the operator pushing the milling tool against the resistance of the spring-cushioned telescoping legs until the bottom surface 26 of the adjustable stop 11 is made to coincide as closely as possible with the surface 6 of the sheet surrounding the rivet head 25. Inasmuch as the bottom surface 26 of the adjustable stop is in the form of a ring enclosing the cutting edges 8, and is constructed so as to be in a plane perpendicular to the axis of the cutter 7, and inasmuch as the stop 11 when correctly adjusted is positioned axially with respect to the chuck 12 so that the bottom surface 26 is even with the cutting edges 8, the rivet head 25 may be therefore milled so as to be even with the surface 6 of the sheet surrounding the said rivet head.

The stabilizing element provides two important effects, as follows: the pads 18 being pressed against the surface 6 by the action of the springs 19 produce a frictional force that resists the tendency of the end-mill cutter 7 to push itself in sidewise directions from the rivet head 25 it is cutting, and; the telescoping legs 15 provide a spring-cushioned support to the milling tool in our invention and act in the manner of a tool rest to facilitate the work of the operator, particularly with respect to the feeding of the cutter 7 into the rivet head.

If the rivet head 25 still projects undesirably above the surrounding surface 6 of the sheet after being spot faced as described, the stop 11 requires adjustment. The nut 14 is turned so as to release the constriction imposed on the segmented skirt of the chuck 12 thus permitting the operator to turn the adjustable stop 11 so that it is drawn by its threads upwards in the chuck 12 a small distance corresponding to the amount of rivet head still remaining to be milled. If, on the other hand, the milling operation had cut too deeply instead of not deeply enough, the adjustable stop is turned in the opposite direction. The nut 14 is then turned so as to constrict the segments of the chuck 12 thus locking the position of the stop 11, and another spot-facing operation is performed. The adjusting procedure described is repeated until the exact degree of smoothness desired of the spot-facing operation is obtained.

The outside rim of the bottom surface 26 of the stop 11 is prevented from accidentally marring the surface of the sheet 6 by a guard sleeve 27 of softer material such as plastic which encircles the lower extremity of the stop 11.

When a rivet head is being milled as described, it is important that no chips be allowed to fall between the bottom surface 26 of the adjustable stop 11 and the sheet 6 in order to maintain the accuracy of the machining operation. The exhaust air from the air motor, therefore, is led through the passageway 28 between the shaft 5 and the exhaust tube 29, a tubular member centrally spaced within the chuck 12 to which it is integrally attached at its upper extremity, and coaxially enclosing the shaft 5. The said exhaust air is directed upwards in a tubular jet from the annular nozzle 30 formed by the suitably shaped rim of the lower extremity of the exhaust tube 29 and the corresponding suitably flanged lower extremity 31 of the shaft 5. The said jet induces a flow of air from the outside into the bottom of the stop 11, said induced air entraining the chips produced by the cutting edges 8 and carrying them upwards past the cutter into the passageway between the stop 11 and the exhaust tube 29. The induced air mingled with the exhaust air carry the said entrained chips through a plurality of openings 32 in the upper portion of the chuck 12 into the exhaust manifold 33 which is a cylindrical member enclosing the openings 32. The exhaust manifold 33 is provided with a single tubular outlet 34 which leads into a clipped-on cloth bag receptacle 35 in which the chips are collected while the air flow is allowed to escape to the outside through the interstices of the cloth. The exhaust manifold 33 is deformed to be slightly ellipsoidal, similarly to the ring 16, so that in a like manner it can grip the lower portion of the housing 1 with a spring force to maintain itself thereon. It is prevented from displacement upwards on the housing 1 by the shoulder 36 against which it rests. Likewise, the stabilizing element is prevented from being displaced upwards by the ring 16 bearing against the bottom of the manifold 33. The biped stabilizing element, furthermore, as described in this specification, does not obstruct the vision of the operator with regard to the work area when the milling tool is in position for operation. This feature is important with regard to the success, ease and rapidity of operation.

The end-mill cutter 7 is provided with endwise cutting edges 8, shown in the figure as perpendicular to the plane of said figure, which are shaped, ground and honed in accordance with the knowledge and practises common in the art, excepting that each said cutting edge is extended inwardly practically to the cutter axis and is provided, for a small distance adjacent to the center of the cutter, with an unusually large clearance angle 37, such as, for example, forty degrees from the plane perpendicular to the cutter axis. The said large clearance angle, in combination with the said extension of cutting edges to the cutter axis are required to enable the end-mill cutter 7 to successfully machine flat and smooth, at the center, circular spots on aluminum-alloy materials such as are employed in aircraft construction.

Although there are known in the art many types of small, light, powered tools adapted for employing milling cutters which may be readily maneuvered in the hands of an operator so as to be applied to a piece of work, but few have been adapted for use with end-mill cutters and none heretofore have been capable of successfully performing a smooth spot-facing operation for trimming the protruding portion of a countersunk rivet head to be even with the adjacent surrounding surface in aluminum-alloy construction. Our invention can readily perform said operation.

Having described in detail a preferred embodiment of our invention, we claim as new and as our invention:

1. A powered hand tool for spot facing aluminum-alloy rivet heads or the like, comprising: a motor means driven by compressed air; a cutter drivably attached to said motor means so as to be revolvable about its own axis, said cutter having endwise cutting edges which can be applied to a piece of work, said cutting edges being substantially in a plane perpendicular to the cutter axis and extending inwardly to said cutter axis, and each cutting edge, moreover, being provided, for a small distance adjacent to the cutter axis, with an unusually large clearance angle, preferably larger than twenty-five degrees; an adjustable means for controlling the depth of cut, said means comprising a cylindrical member coaxially encircling the cutter, which is free to revolve therein, and having its outer rim in a plane perpendicular to the axis of said cutter, said cylindrical member being threadably engaged within a tubular chuck fixedly mounted on the body of said tool, the said chuck having a slotted tapered skirt encircled by the correspondingly tapered bore of a cylindrical nut; a chip-disposal means comprising a tubular member coaxially enclosing the lower portion of the shaft and spaced therefrom, the exhaust air from the said motor being ducted therebetween and allowed to escape from between the lower extremities thereof which are suitably flanged to form an annular nozzle encircling the outside of said tubular member and directed oppositely from the cutting edges, a cylindrical member coaxially surrounding said annular nozzle and spaced therefrom, the upper portion thereof containing discharge outlets, and; a stabilizing element, for supporting the said tool in sidewise and endwise relation to the work, comprising two mutually independently telescoping legs extended under the pressure of internally disposed coil springs in a direction substantially parallel to the cutter axis, said telescoping legs being provided at the outer extremities with pads of friction-producing material; and said powered hand tool being substantially as described in the foregoing specification.

2. A powered hand tool comprising: a motor means; a cutter having endwise cutting edges which can be applied to a piece of work, said cutter being drivably attached to said motor means so as to be revolvable about its own axis; a stabilizing element for supporting said tool with relation to the work, comprising a plurality of mutually independent collapsible legs being extended under spring pressure, or the equivalent thereof, in a direction substantially parallel to the cutter axis, and; an adjustable means for controlling the depth of cut, said means comprising a cylindrical member coaxial with and freely surrounding the cutter, and having its outer rim in a plane perpendicular to the axis of said cutter, the said cylindrical member being threadably engaged within a tubular chuck fixedly mounted on the body of said hand tool, the said chuck having a slotted tapered skirt encircled by the correspondingly tapered bore of a cylindrical nut, the said adjustable means being substantially as described in the foregoing specification.

3. A powered hand tool comprising: a motor means; a cutter having endwise cutting edges; one or more collapsible legs alined substantially parallel to the axis of said cutter, and; a sleeve encircling said cutter and spaced therefrom and adjustable axially with respect to said cutter, the said cutter being replaceable.

4. A powered hand tool comprising: a motor means; a replaceable cutter having endwise cutting edges; a sleeve encircling said cutter and spaced therefrom and adjustable axially with respect to said cutter; a nozzle within the said sleeve directing an airstream into the said sleeve away from the said cutting edges, and; one or more collapsible legs alined substantially parallel to the axis of the said cutter.

ALBERT SHERMAN.
ROBERT GOTTLIEB.

(References on following page)

REFERENCES CITED

The following references are of record in the file of this patent:

UNITED STATES PATENTS

| Number | Name | Date |
|---|---|---|
| 606,549 | Holmes | June 28, 1898 |
| 833,001 | Press | Oct. 9, 1906 |
| 1,055,013 | Bennington et al. | Mar. 4, 1913 |
| 1,115,348 | Taylor | Oct. 27, 1914 |
| 2,292,581 | Richardson | Aug. 11, 1942 |
| 2,301,151 | Spievak | Nov. 3, 1942 |
| 2,308,728 | Vancil et al. | Jan. 19, 1943 |
| 2,343,875 | Schwartz | Mar. 14, 1944 |

FOREIGN PATENTS

| Number | Country | Date |
|---|---|---|
| 13,034 | France | Nov. 2, 1910 |
| 387,512 | Germany | Jan. 5, 1924 |
| 573,585 | France | Mar. 13, 1924 |